United States Patent
Effendy et al.

(10) Patent No.: US 10,644,957 B1
(45) Date of Patent: May 5, 2020

(54) CENTRALIZED CONTROLLER-BASED DYNAMIC NETWORK BANDWIDTH ALLOCATION AND MANAGEMENT

(71) Applicant: Juniper Networks, Inc., Sunnyvale, CA (US)

(72) Inventors: Francois Effendy, Franklin Park, NJ (US); Hsiuyen Tsai, Edison, NJ (US); Jenchieh Tsai, Millburn, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/290,449

(22) Filed: Mar. 1, 2019

(51) Int. Cl.
    *H04L 12/24* (2006.01)
    *H04L 12/911* (2013.01)
    *H04L 12/26* (2006.01)

(52) U.S. Cl.
    CPC .......... *H04L 41/0896* (2013.01); *H04L 41/12* (2013.01); *H04L 43/067* (2013.01); *H04L 47/781* (2013.01)

(58) Field of Classification Search
    CPC ... H04L 41/0896; H04L 41/12; H04L 43/067; H04L 47/781
    See application file for complete search history.

(56) References Cited

U.S. PATENT DOCUMENTS

| | | | |
|---|---|---|---|
| 9,253,074 B1* | 2/2016 | Kumar | H04L 45/02 |
| 2017/0201450 A1* | 7/2017 | Pepe | H04L 41/142 |
| 2018/0115469 A1* | 4/2018 | Erickson | H04L 41/12 |

* cited by examiner

*Primary Examiner* — Kyaw Z Soe
(74) *Attorney, Agent, or Firm* — Harrity & Harrity, LLP

(57) ABSTRACT

A device receives topology data and path data associated with a network that includes network devices. The device determines planned bandwidths for new paths through the network based on the topology data and the path data, and ranks the new paths, based on the planned bandwidths, to generate a ranked list. The device selects information identifying a first new path from the ranked list, wherein the first new path includes a first planned bandwidth. The device determines whether the first new path can be provided via a single route through the network based on the first planned bandwidth, and identifies two or more routes through the network for the first new path when the first new path cannot be provided via the single route. The device causes the first planned bandwidth to be reserved by two or more of the network devices for the two or more routes.

20 Claims, 14 Drawing Sheets

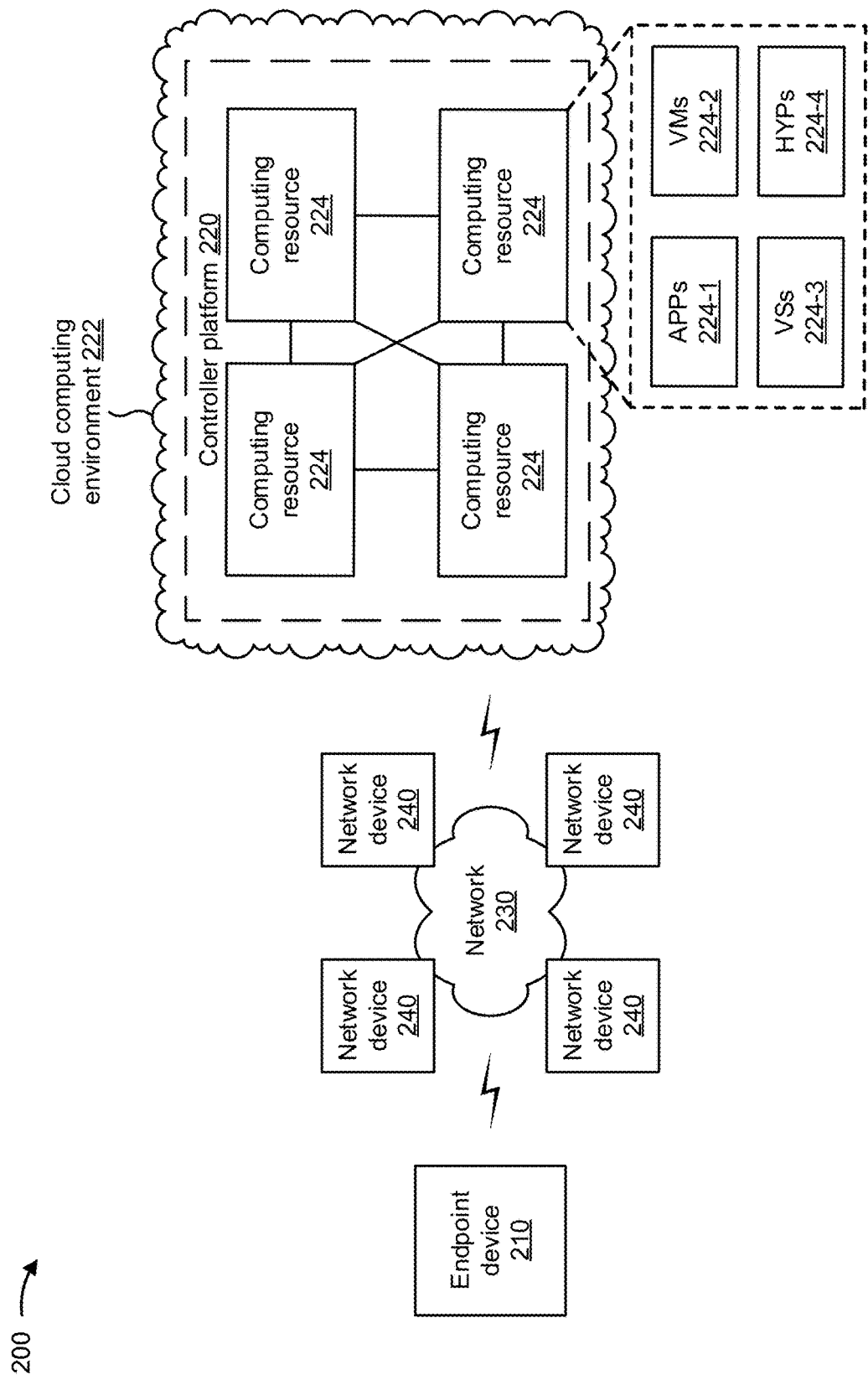

CENTRALIZED CONTROLLER-BASED DYNAMIC NETWORK BANDWIDTH ALLOCATION AND MANAGEMENT

BACKGROUND

Network bandwidth management is the process of measuring and controlling communications (e.g., traffic, packets, and/or the like) on links of a network, to avoid filling one or more of the links to capacity or overfilling the links, which would result in network congestion and poor performance of the network.

SUMMARY

According to some implementations, a method may include receiving topology data and path data associated with a network, wherein the network includes a plurality of network devices interconnected by links, and determining a plurality of planned bandwidths for a plurality of new paths through the network based on the topology data and the path data. The method may include ranking the plurality of new paths, based on the plurality of planned bandwidths for the plurality of new paths, to generate a ranked list of the plurality of new paths, and selecting information identifying a first new path from the ranked list of the plurality of new paths, wherein the first new path includes a first planned bandwidth of the plurality of planned bandwidths. The method may include determining whether the first new path can be provided via a single route through the network based on the first planned bandwidth, and identifying two or more routes through the network for the first new path when the first new path cannot be provided via the single route through the network. The method may include causing the first planned bandwidth to be reserved by two or more of the plurality of network devices for the two or more routes through the network for the first new path.

According to some implementations, a device may include one or more memories, and one or more processors, communicatively coupled to the one or more memories, to receive topology data associated with a network, wherein the network includes a plurality of network devices interconnected by links, and wherein the topology data includes data identifying one or more of the plurality of network devices, the links interconnecting the plurality of network devices, or utilizations of the plurality of network devices. The one or more processors may receive path data associated with the network, wherein the path data includes data identifying one or more of: paths through the network provided by the plurality of network devices, sources of the paths through the network, destinations of the paths through the network, or utilizations of the paths through the network. The one or more processors may determine a plurality of planned bandwidths for a plurality of new paths through the network based on the topology data and the path data, and may rank the plurality of new paths, based on the plurality of planned bandwidths for the plurality of new paths, to generate a ranked list of the plurality of new paths. The one or more processors may select information identifying a first new path from the ranked list of the plurality of new paths, wherein the first new path includes a first planned bandwidth of the plurality of planned bandwidths, and may determine whether the first new path can be provided via a single route through the network based on the first planned bandwidth. The one or more processors may cause, when the first new path can be provided via the single route through the network, the first planned bandwidth to be reserved by two or more of the plurality of network devices for the single route through the network for the first new path.

According to some implementations, a non-transitory computer-readable medium may store instructions that include one or more instructions that, when executed by one or more processors, cause the one or more processors to receive topology data and path data associated with a network, wherein the network includes a plurality of network devices interconnected by links. The one or more instructions may cause the one or more processors to determine a plurality of planned bandwidths for a plurality of new paths through the network based on the topology data and the path data, and rank the plurality of new paths, based on the plurality of planned bandwidths for the plurality of new paths, to generate a ranked list of the plurality of new paths. The one or more instructions may cause the one or more processors to select information identifying each of the plurality of new paths, from the ranked list of the plurality of new paths, based on ranks associated with the plurality of new paths, and determine that each of the plurality of new paths can be provided via a single route through the network or via two or more routes through the network based on the plurality of planned bandwidths. The one or more instructions may cause the one or more processors to cause the plurality of planned bandwidths to be reserved by the plurality of network devices for the plurality of new paths.

BRIEF DESCRIPTION OF THE DRAWINGS

FIG. 2 is a diagram of an example environment in which systems and/or methods described herein may be implemented.

DETAILED DESCRIPTION

The following detailed description of example implementations refers to the accompanying drawings. The same reference numbers in different drawings may identify the same or similar elements.

Currently, some network devices (e.g., routers, switches, gateways, firewalls, etc.) utilize internal logic to manage network bandwidth in a distributed manner on links provided between the network devices. In such systems, each network device manages network bandwidth without any knowledge of how other network devices are managing network bandwidth, which results in inefficient network bandwidth allocation, inefficient utilization of network resources, and traffic outages in the network. This causes computing resources (e.g., processing resources, memory resources, and/or the like), networking resources, and/or the like to be wasted in identifying and/or correcting traffic outages, re-routing traffic, locating lost traffic, and/or the like.

Some implementations described herein provide a controller platform that provides centralized dynamic network bandwidth allocation and management. For example, the controller platform may receive topology data and path data associated with a network, wherein the network includes network devices interconnected by links. The controller platform may determine planned bandwidths for new paths through the network based on the topology data and the path data, and may rank the new paths, based on the planned bandwidths for the new paths, to generate a ranked list of the new paths. The controller platform may select information identifying each of the new paths, from the ranked list of the new paths, based on ranks associated with the new paths, and may determine that each of the new paths can be provided via a single route through the network or via two or more routes through the network based on the planned bandwidths. The controller platform may cause the planned bandwidths to be reserved by the network devices for the new paths.

In this way, traffic may be efficiently routed in a network, which reduces or prevents traffic outages in the network (e.g., that cause traffic to be lost, cause traffic to be delayed, require re-routing of traffic, and/or the like). This, in turn, conserves computing resources (e.g., processing resources, memory resources, and/or the like), networking resources, and/or the like that would otherwise be wasted in identifying and/or correcting the traffic outage, re-routing traffic, locating lost traffic, and/or the like.

Figure 1A:
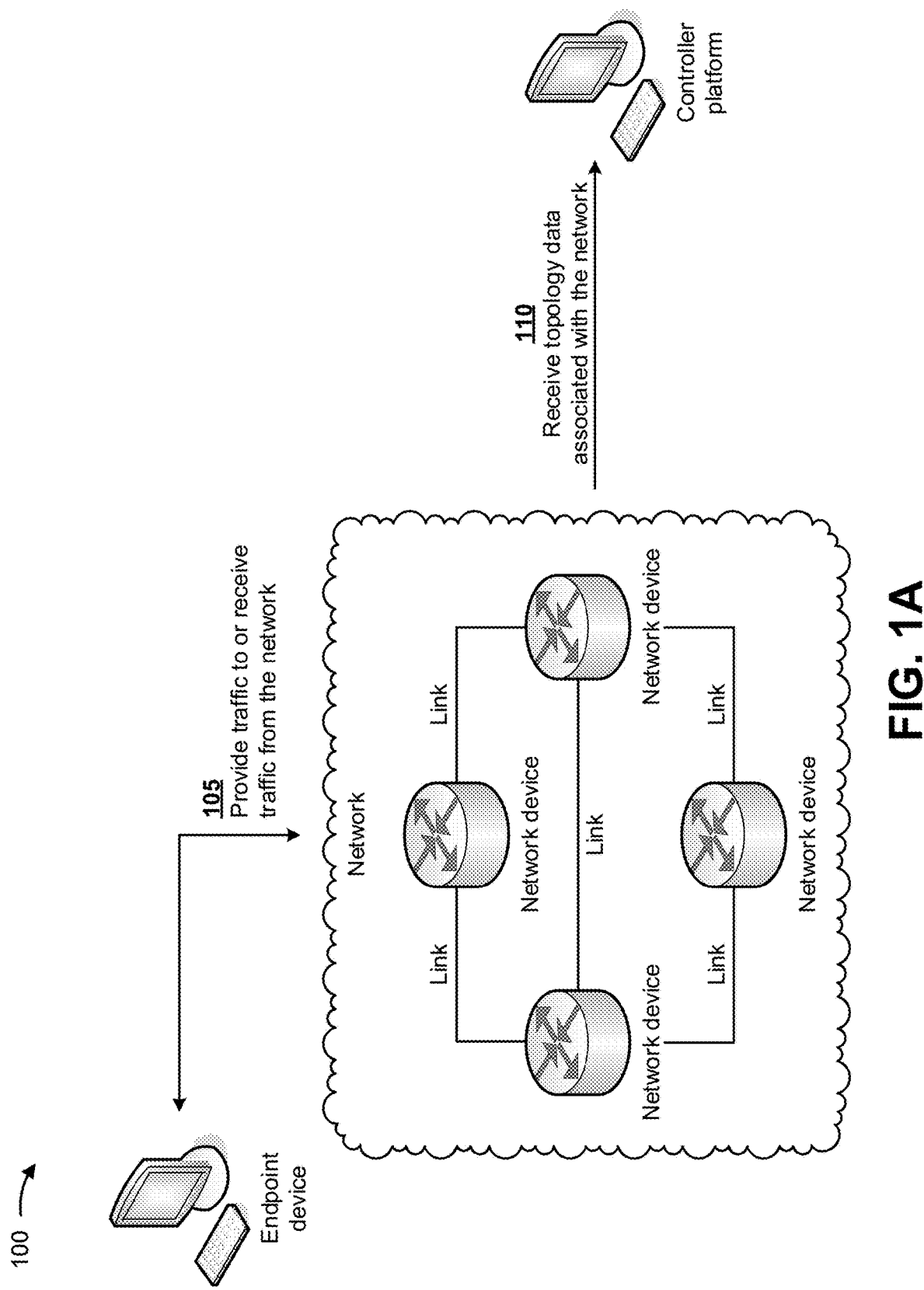
FIGS. 1A-1I are diagrams of one or more example implementations described herein.

FIGS. 1A-1I are diagrams of one or more example implementations 100 described herein. As shown in FIG. 1A, an endpoint device may be associated with a network. As further shown in FIG. 1A, the network may include multiple network devices and multiple links provided between the multiple network devices. The four network devices and five links shown in FIG. 1A are provided merely as examples of network devices and links, and, in practice, the network may include additional network devices and/or links.

As further shown in FIG. 1A, and by reference number 105, the endpoint device may provide traffic to and/or receive traffic from the network. In some implementations, the traffic from the endpoint device may be provided to one or more of the network devices and the one or more of the network devices may process the traffic accordingly (e.g., by forwarding the traffic to other network devices and/or endpoint devices). In some implementations, traffic may be processed by one or more network devices and forwarded to the endpoint device.

As further shown in FIG. 1A, and by reference number 110, the controller platform may receive topology data associated with the network. In some implementations, the topology data may include data identifying the network devices (e.g., data identifying types of the network devices, network identifiers of the network devices, locations of the network devices, hardware and/or software associated with the network devices, other network devices that are adjacent to the network devices, links connected to the network devices, ports associated with the network devices, and/or the like), the links interconnecting the network devices (e.g., data identifying types of the links, protocols used by the links, network devices to which the links are connected, ports associated with the network devices, and/or the like), utilizations of the network devices (e.g., capacities of the network devices, throughputs of the network devices, and/or the like), and/or the like. The controller platform may periodically receive the topology data from the network (e.g., at particular time intervals in seconds, minutes, hours, days, and/or the like), may continuously receive the topology data from the network, and/or the like. For example, the controller platform may provide, to the network devices, a request for the topology data, and the network devices may provide the topology data to the controller platform based on the request.

Figure 1B:
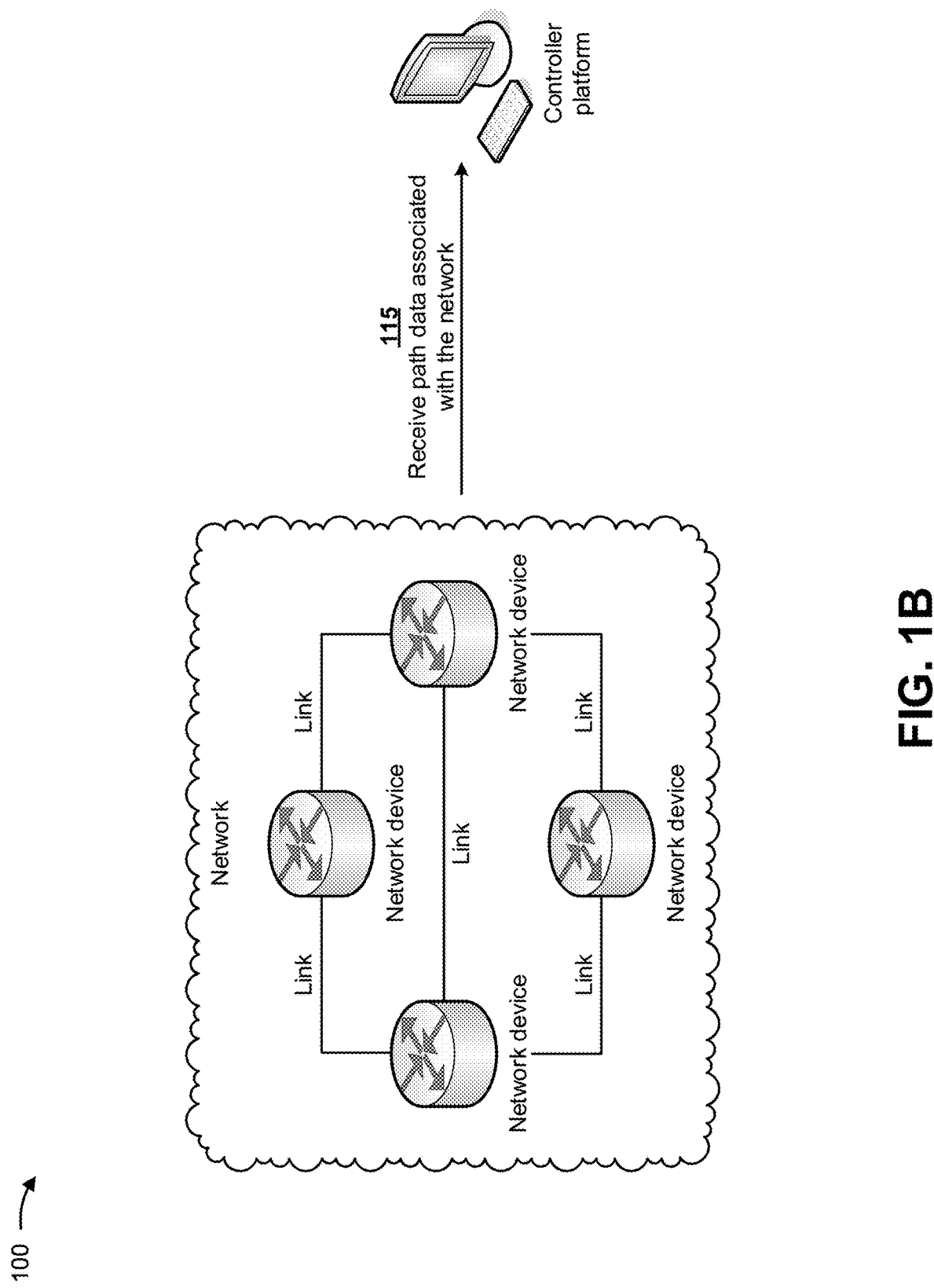

As shown in FIG. 1B, and by reference number 115, the controller platform may receive path data associated with the network. In some implementations, the path data may include data identifying paths through the network provided by the network devices, sources (e.g., one or more of the network devices, and/or the like) of the paths through the network, destinations (e.g., one or more of the network devices, and/or the like) of the paths through the network, utilizations of the paths through the network (e.g., capacities of the paths, throughputs of the paths, and/or the like), and/or the like. The controller platform may periodically receive the path data from the network (e.g., at particular time intervals in seconds, minutes, hours, days, and/or the like), may continuously receive the path data from the network, and/or the like. For example, the controller platform may provide, to the network devices, a request for the path data, and the network devices may provide the path data to the controller platform based on the request.

Figure 1C:
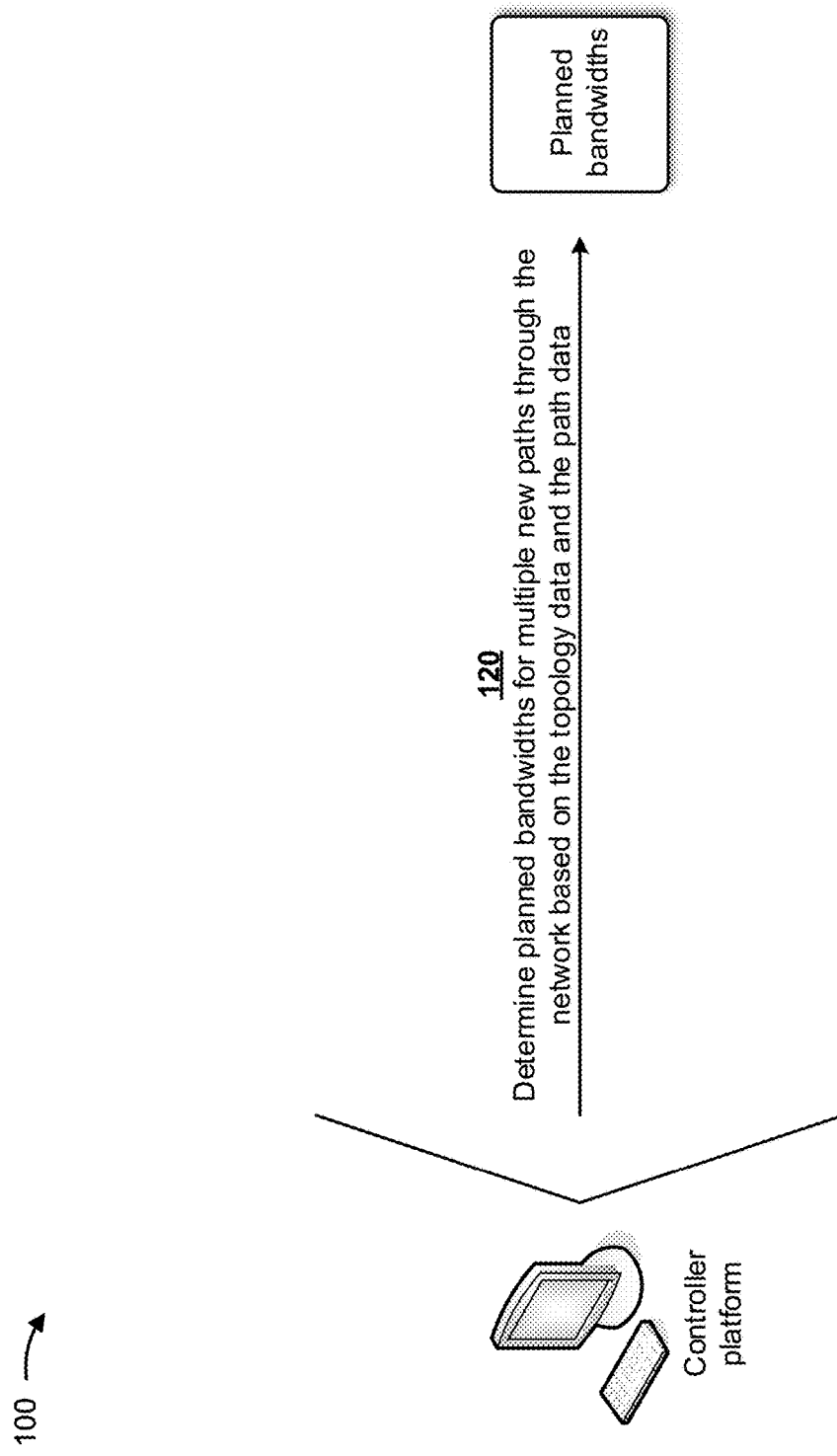

As shown in FIG. 1C, and by reference number 120, the controller platform may determine planned bandwidths for multiple new paths through the network based on the topology data and the path data. In some implementations, the controller platform may determine the planned bandwidths after a particular time period (e.g., in minutes, hours, days, and/or the like) that is defined by the controller platform or input by a user of the controller platform. The controller platform may aggregate bandwidth associated with the topology data and/or the path data (e.g., traffic demands of the network devices and the paths as determined based on the utilizations of the network devices and the paths), over the particular time period, to generate aggregated bandwidths over the particular time period. The planned bandwidths may correspond to the aggregated bandwidths determined over the particular time period. In some implementations, the planned bandwidths may correspond to portions of the aggregated bandwidths (e.g., 80%, 90%, 95%, and/or the like of the aggregated bandwidths), averages of the aggregated bandwidths, maximums of the aggregated bandwidths, and/or the like.

In one example, the planned bandwidths may be determined to prevent identified traffic congestion in current paths of the network. In this way, the controller platform may prevent traffic congestion in the network and may prevent packets from being dropped due to the traffic congestion. This, in turn, conserves computing resources (e.g., processing resources, memory resources, etc.), networking resources, and/or the like that would otherwise be wasted identifying dropped packets, recovering dropped packets, re-transmitting dropped packets, and/or the like.

In some implementations, the network may include hundreds, thousands, etc. of network devices and/or links that generate thousands, millions, billions, etc. of data points. In this way, the controller platform may handle thousands, millions, billions, etc., of data points within the particular time period (e.g., when determining the new paths and the planned bandwidths), and thus may provide "big data" capability.

In some implementations, the controller platform may assign attributes to each of the new paths. The attributes for a new path may include an attribute identifying a name of the new path, an attribute identifying a minimum signaling bandwidth of the new path (e.g., a smallest bandwidth allowed to be signaled for the new path), an attribute identifying a maximum signaling bandwidth of the new path (e.g., a largest bandwidth allowed to be signaled for the new path), a merging bandwidth (e.g., a lower bandwidth threshold on aggregate bandwidth usage for the new path), a splitting bandwidth (e.g., an upper bandwidth threshold on the aggregate bandwidth usage for the new path), and/or the like.

Figure 1D:
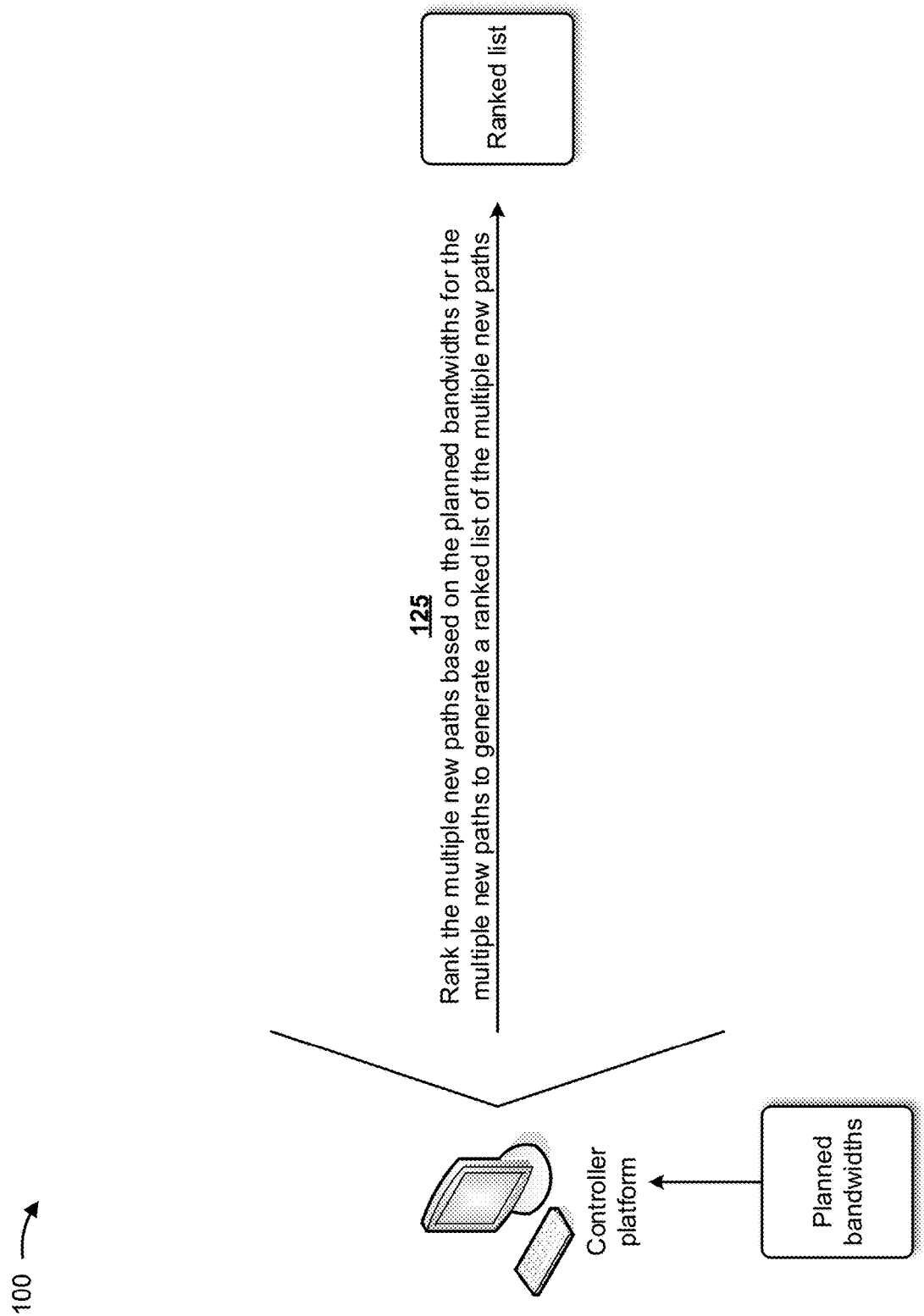

As shown in FIG. 1D, and by reference number 125, the controller platform may rank the multiple new paths based on the planned bandwidths for the multiple new paths to generate a ranked list of the multiple new paths. For example, if one new path has a planned bandwidth of 30 gigabits, another new path has a planned bandwidth of 50 gigabits, and still another new path has a planned bandwidth of 60 gigabits, the controller platform may rank the new path with the 60 gigabit planned bandwidth in a first position of the ranked list, may rank the second new path with the 50 gigabit planned bandwidth in a second position of the ranked list, and may rank the new path with the 30 gigabit planned bandwidth in a third position of the ranked list.

Figure 1E:
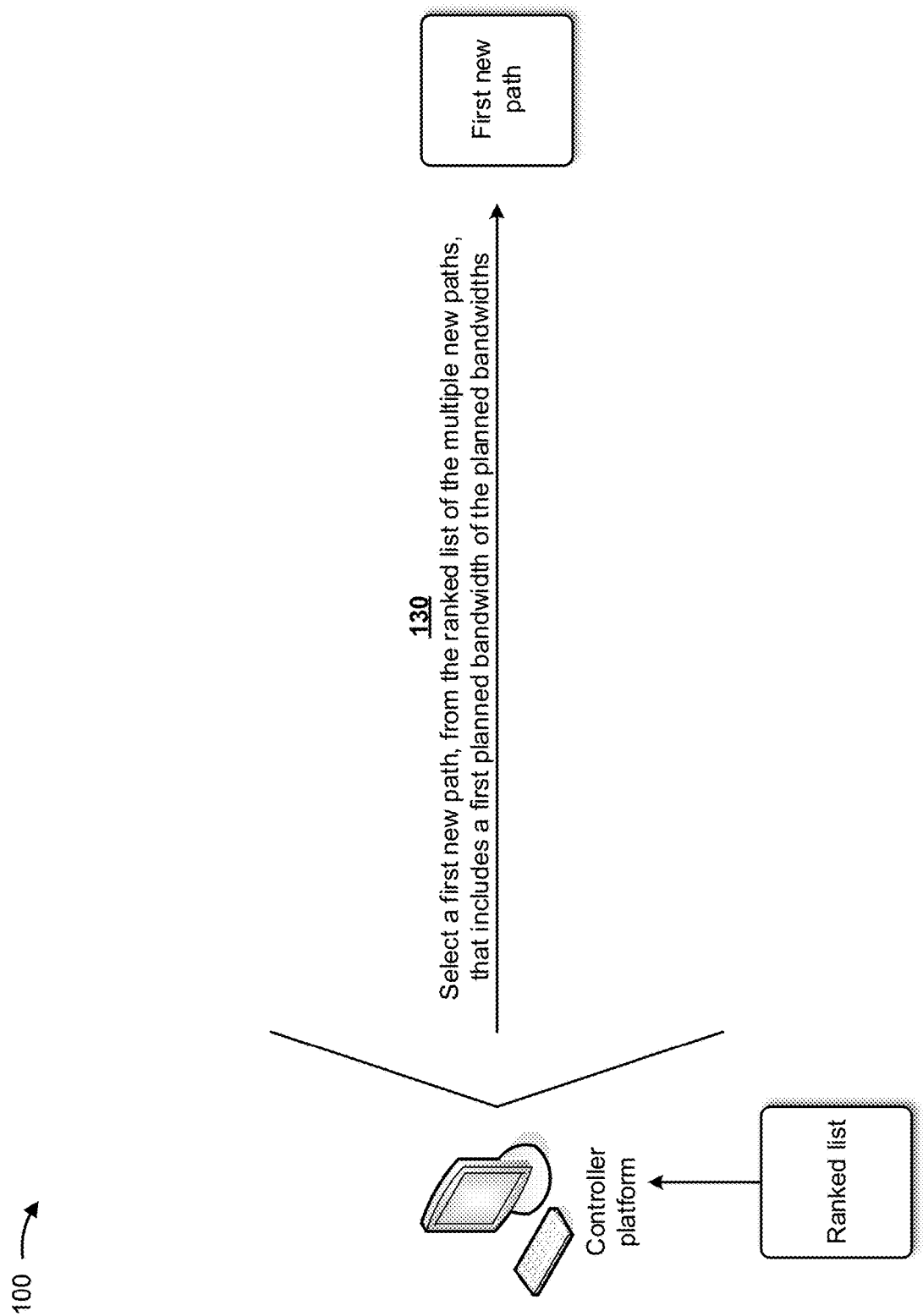

As shown in FIG. 1E, and by reference number 130, the controller platform may select a first new path, from the ranked list of the multiple new paths, that includes a first planned bandwidth of the planned bandwidths. The first planned bandwidth may be a greatest bandwidth of the planned bandwidths. In some implementations, the controller platform may attempt to reserve the planned bandwidths in the network based on the ranked list of the multiple new paths. In this way, the controller platform may first reserve a largest planned bandwidth in the network, then may reserve a second largest planned bandwidth in the network, and/or the like. The controller platform may reserve bandwidth in the network in this manner since each planned bandwidth is preferably to be provided via a single route through the network in order to reduce maintenance of path state information in the network devices. In this way, the controller platform may conserve computing resources of the network devices that would otherwise be wasted maintaining path state information.

Figure 1F:
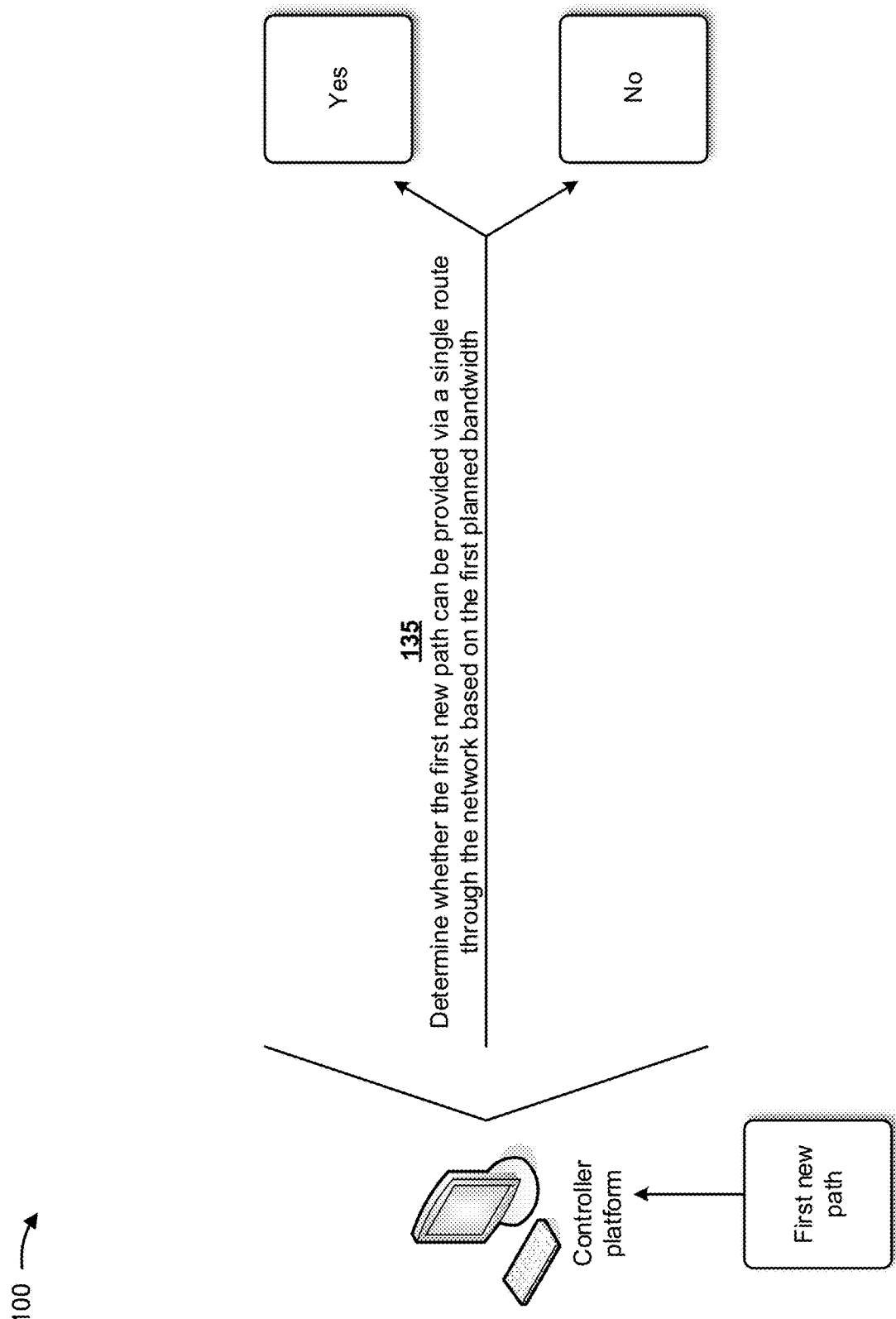

As shown in FIG. 1F, and by reference number 135, the controller platform may determine whether the first new path can be provided via a single route through the network based on the first planned bandwidth. In some implementations, the controller platform may determine whether the first new path can be provided via the single route through the network based on a constrained shortest path first (CSPF) constraint. A path computed using CSPF is a shortest path fulfilling a set of constraints. The set of constraints may include constraints associated with a minimum bandwidth required per link (e.g., a bandwidth guarantee constraint), an end-to-end delay, a maximum number of links traversed, include/exclude nodes, and/or the like. The controller platform may determine that the first new path can be provided via the single route when the first planned bandwidth can be accommodated by the single route (e.g., based on the CSPF constraint). The controller platform may determine that the first new path cannot be provided via the single route when the first planned bandwidth cannot be accommodated by the single route (e.g., based on the CSPF constraint).

Figure 1G:
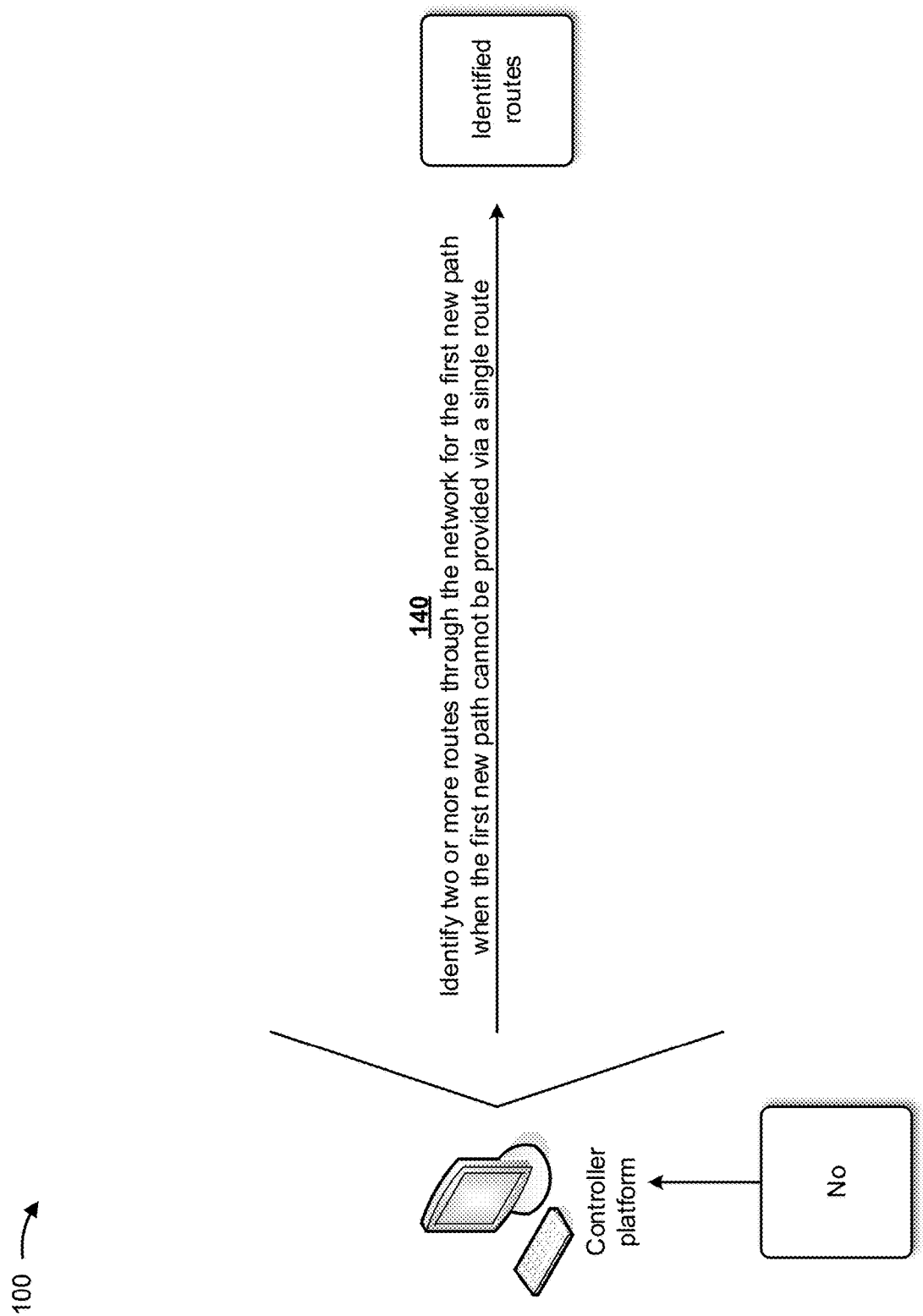

As shown in FIG. 1G, and by reference number 140, the controller platform may identify two or more routes through the network for the first new path when the first new path cannot be provided via the single route. For example, the controller platform may attempt to identify two routes through the network for the first new path when the first new path cannot be provided via the single route. If the controller platform determines that the identified two routes are unable to accommodate the first planned bandwidth, the controller platform may attempt to identify three routes through the network for the first new path. This process may continue until a particular quantity of routes through the network can accommodate the first planned bandwidth. For example, if the first planned bandwidth is ten gigabits and the single route cannot accommodate the ten gigabits, the controller platform may identify two five gigabit routes to accommodate the first planned bandwidth for the first new path.

Figure 1H:
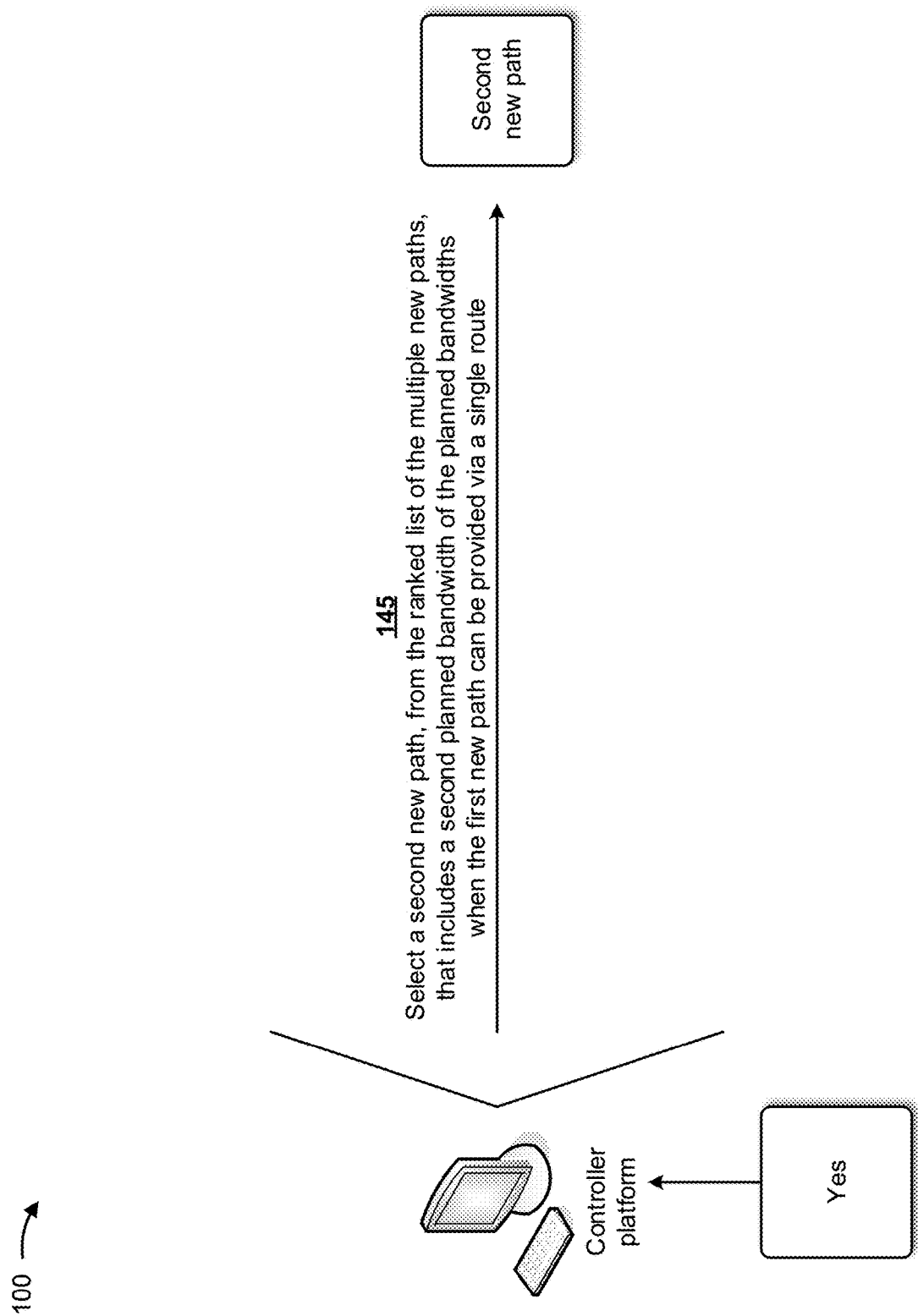

As shown in FIG. 1H, and by reference number 145, the controller platform may select a second new path, from the ranked list of the multiple new paths, that includes a second planned bandwidth of the planned bandwidths after determining that the first new path can be provided via the single route or via the two or more routes. The second planned bandwidth may be a second greatest bandwidth of the planned bandwidths and may be less than the first planned bandwidth. The controller platform may determine whether the second new path can be provided via a single route through the network based on the second planned bandwidth, as described above in connection with FIG. 1F. The controller platform may continue this process until paths through the network are determined for all of the new paths set forth in the ranked list of the multiple new paths.

Figure 1I:
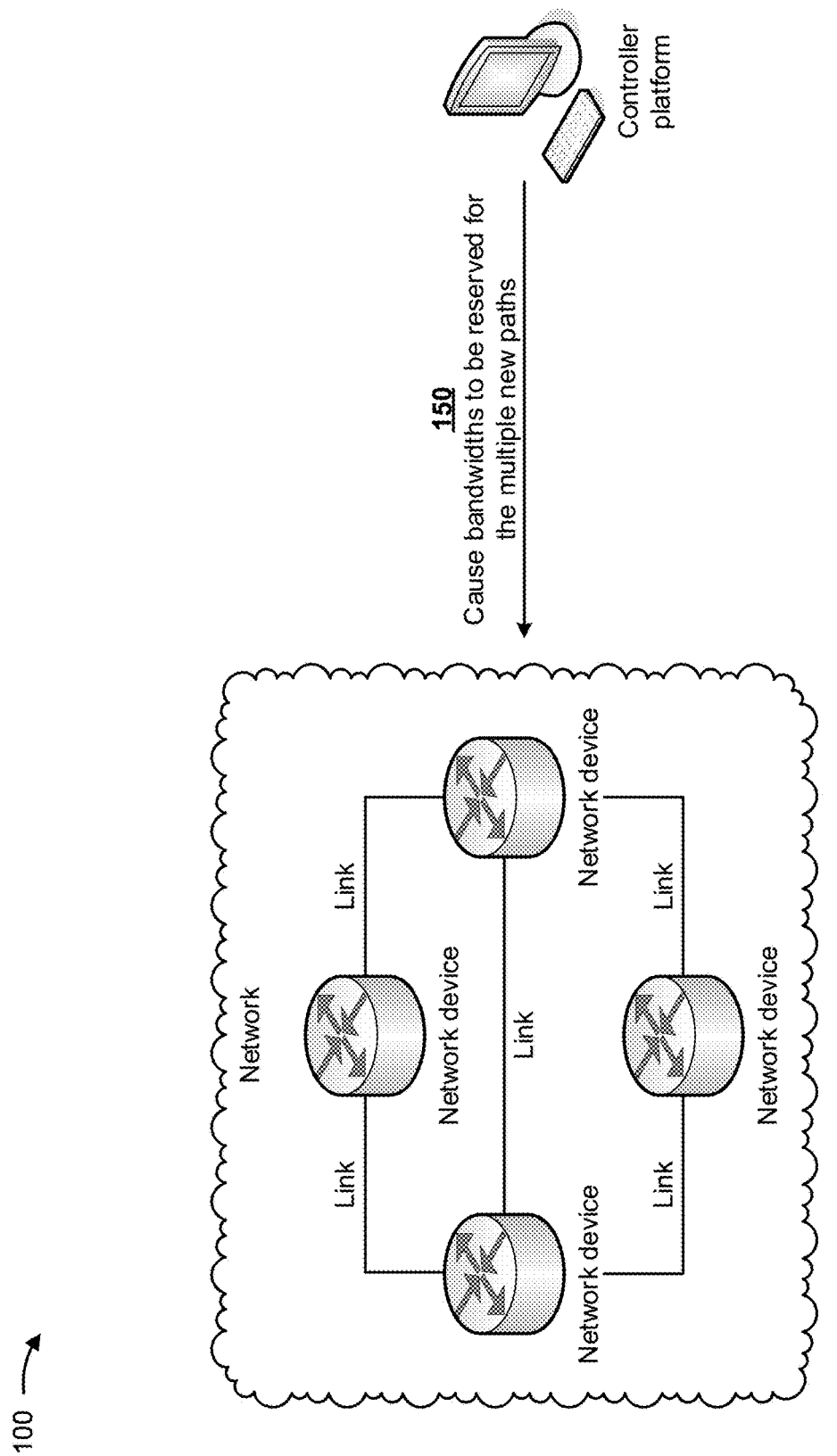

As shown in FIG. 1I, and by reference number 150, the controller platform may cause bandwidths to be reserved through the network for the multiple new paths. For example, the controller platform may cause the first planned bandwidth to be reserved through the network for the first new path, may cause the second planned bandwidth to be reserved through the network for the second new path, and/or the like. In some implementations, the controller platform may cause the bandwidths to be reserved for the multiple new paths by providing, to one or more of the network devices, instructions indicating that the one or more network devices, and the links associated with the one or more network devices, are to reserve the bandwidths for the multiple new paths. The one or more network devices may receive the instructions and may reserve the bandwidths for the multiple new paths based on the instructions. For example, the controller device may provide, to three network devices, instructions indicating that the three network devices (e.g., and two links provided between the three network devices) are to reserve the first planned bandwidth for the first new path. The three network devices may receive the instructions and may reserve the first planned bandwidth for the first new path based on the instructions.

In some implementations, the controller platform may instruct the network devices to signal one or more paths through the network without any bandwidth reservation along the paths. The controller platform may create a network model and may maintain the bandwidth reservation locally, while the network devices may remain unaware of the bandwidth reservation. This may provide flexibility for the controller platform to relocate bandwidth resource and to determine optimal paths without having to consider whether resources have been released by the network devices.

In this way, traffic may be continuously routed in a network, which reduces or prevents traffic outages in the network (e.g., that cause traffic to be lost, cause traffic to be delayed, require re-routing of traffic, and/or the like). This conserves computing resources (e.g., processing resources, memory resources, and/or the like), networking resources, and/or the like that would otherwise be wasted in identifying and/or correcting the traffic outage, re-routing traffic, locating lost traffic, and/or the like. Furthermore, implementations described herein use a rigorous, computerized process to perform tasks that were not previously performed. For example, currently there does not exist a technique that provides centralized dynamic network bandwidth allocation and management.

As indicated above, FIGS. 1A-1I are provided merely as examples. Other examples may differ from what is described with regard to FIGS. 1A-1I.

FIG. 2 is a diagram of an example environment 200 in which systems and/or methods described herein may be implemented. As shown in FIG. 2, environment 200 may include an endpoint device 210, a controller platform 220, a network 230, and a group of network devices 240 of network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, endpoint device 210 may receive information from and/or transmit information to controller platform 220, via network 230 and network devices 240. In some implementations, endpoint device 210 may receive network traffic from and/or may provide network traffic to other endpoint devices 210 via network 230 (e.g., by routing packets using network devices 240 as intermediaries).

Controller platform 220 includes one or more devices that provide centralized dynamic network bandwidth allocation and management. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more endpoint devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by endpoint device 210. Application 224-1 may eliminate a need to install and execute the software applications on endpoint device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of endpoint device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 240 may include a gateway, a switch, a firewall, a hub, a bridge, a reverse proxy, a server (e.g., a proxy server, a cloud server, a data center server, etc.), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
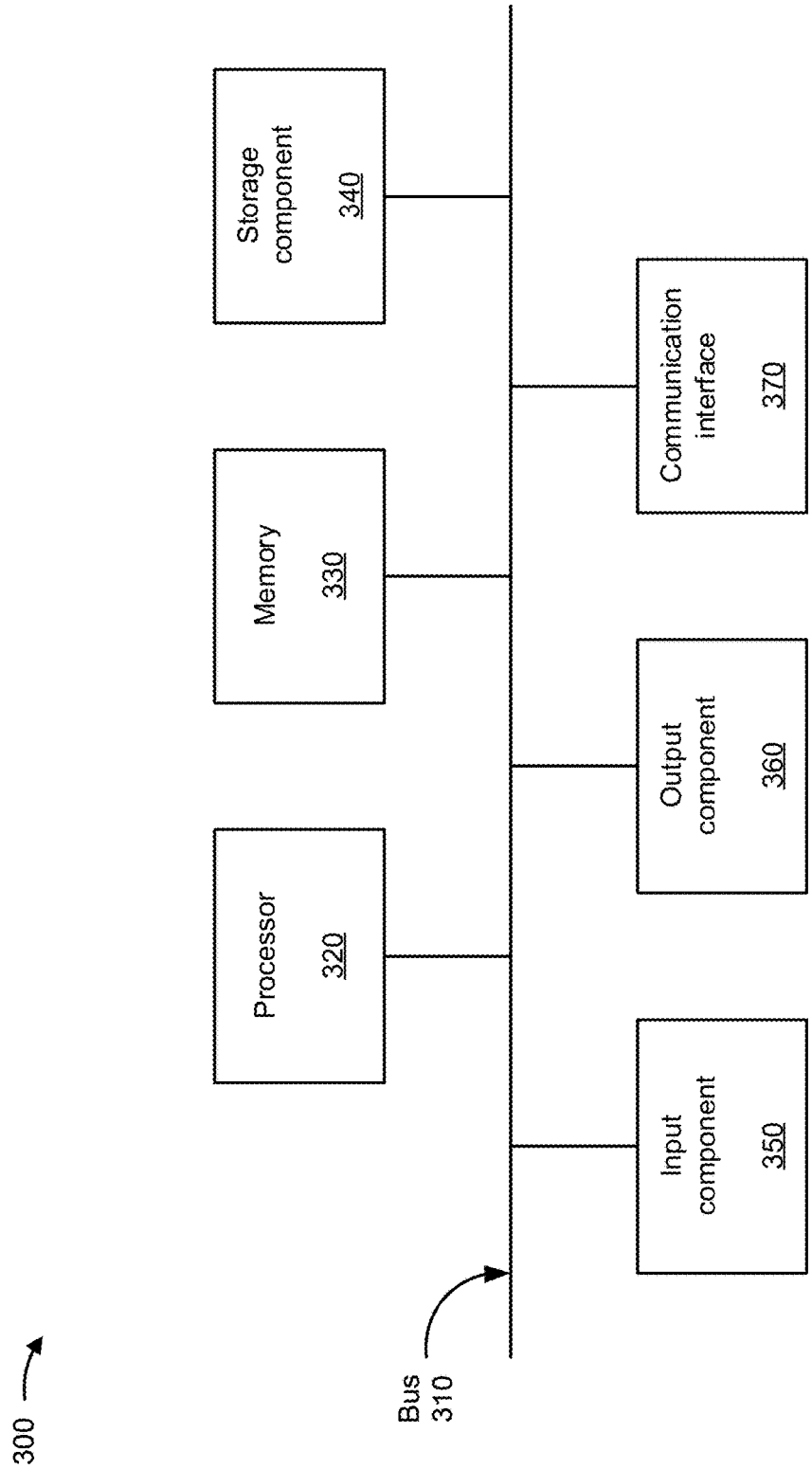
FIG. 3 is a diagram of example components of one or more devices of FIG. 2.

FIG. 3 is a diagram of example components of a device 300. Device 300 may correspond to endpoint device 210, controller platform 220, computing resource 224, and/or network device 240. In some implementations, endpoint device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
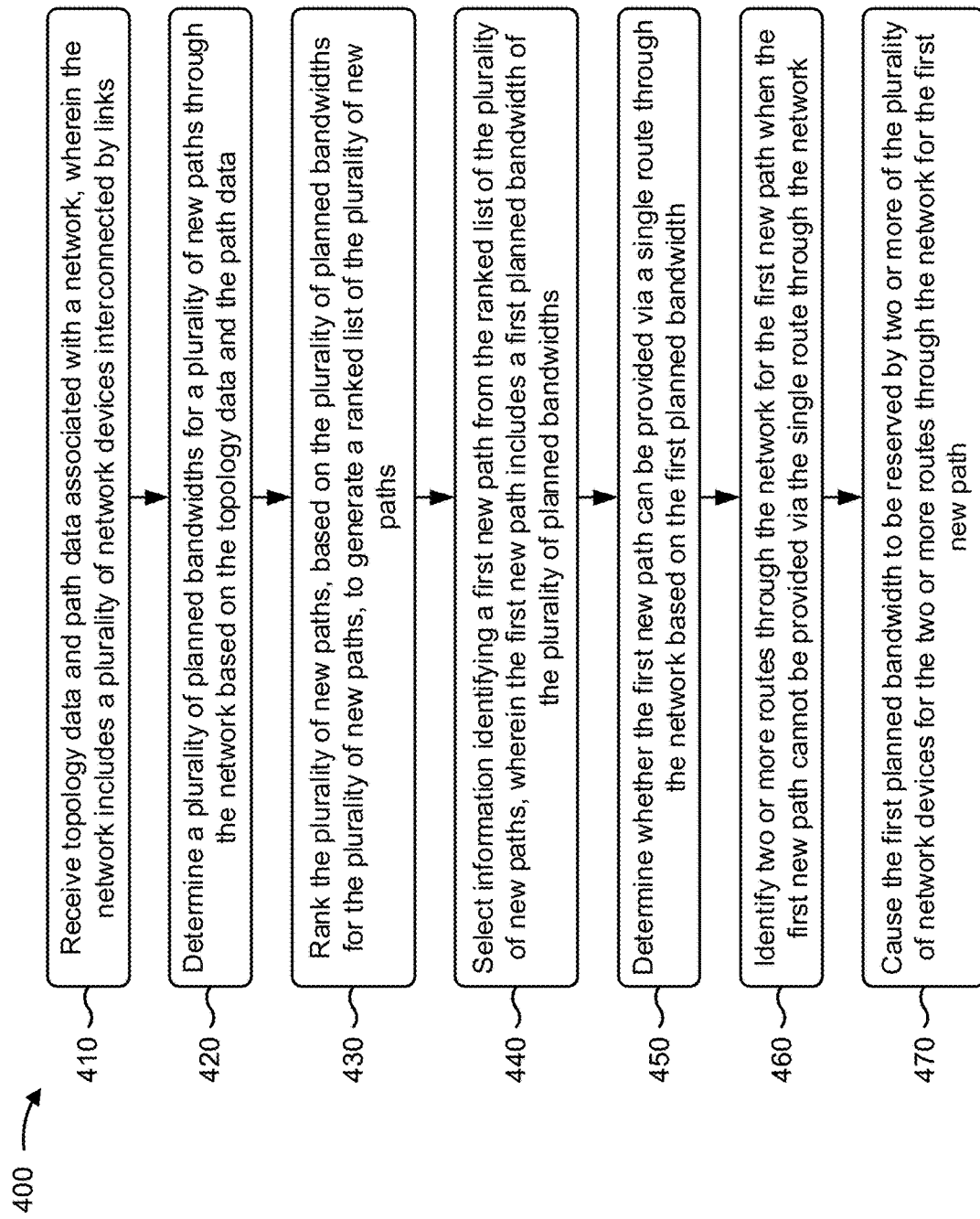
FIGS. 4-6 are flow charts of example processes for providing centralized dynamic network bandwidth allocation and management.

FIG. 4 is a flow chart of an example process 400 for providing centralized dynamic network bandwidth allocation and management. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as an endpoint device (e.g., endpoint device 210) and/or a network device (e.g., network device 240).

As shown in FIG. 4, process 400 may include receiving topology data and path data associated with a network wherein the network includes a plurality of network devices interconnected by links (block 410). For example, the controller platform (e.g., using computing resource 224, processor 320, communication interface 370, and/or the like) may receive topology data and path data associated with a network, as described above in connection with FIGS. 1A-3. In some aspects, the network includes a plurality of network devices interconnected by links.

As further shown in FIG. 4, process 400 may include determining a plurality of planned bandwidths for a plurality of new paths through the network based on the topology data and the path data (block 420). For example, the controller platform (e.g., using computing resource 224, processor 320, memory 330, and/or the like) may determine a plurality of planned bandwidths for a plurality of new paths through the network based on the topology data and the path data, as described above in connection with FIGS. 1A-3.

As further shown in FIG. 4, process 400 may include ranking the plurality of new paths, based on the plurality of planned bandwidths for the plurality of new paths, to generate a ranked list of the plurality of new paths (block 430). For example, the controller platform (e.g., using computing resource 224, processor 320, storage component 340, and/or the like) may rank the plurality of new paths, based on the plurality of planned bandwidths for the plurality of new paths, to generate a ranked list of the plurality of new paths, as described above in connection with FIGS. 1A-3.

As further shown in FIG. 4, process 400 may include selecting information identifying a first new path from the ranked list of the plurality of new paths, wherein the first new path includes a first planned bandwidth of the plurality of planned bandwidths (block 440). For example, the controller platform (e.g., using computing resource 224, processor 320, memory 330, and/or the like) may select information identifying a first new path from the ranked list of the plurality of new paths, as described above in connection with FIGS. 1A-3. In some aspects, the first new path includes a first planned bandwidth of the plurality of planned bandwidths.

As further shown in FIG. 4, process 400 may include determining whether the first new path can be provided via a single route through the network based on the first planned bandwidth (block 450). For example, the controller platform (e.g., using computing resource 224, processor 320, storage component 340, and/or the like) may determine whether the first new path can be provided via a single route through the network based on the first planned bandwidth, as described above in connection with FIGS. 1A-3.

As further shown in FIG. 4, process 400 may include identifying two or more routes through the network for the first new path when the first new path cannot be provided via the single route through the network (block 460). For example, the controller platform (e.g., using computing resource 224, processor 320, memory 330, and/or the like) may identify two or more routes through the network for the first new path when the first new path cannot be provided via the single route through the network, as described above in connection with FIGS. 1A-3.

As further shown in FIG. 4, process 400 may include causing the first planned bandwidth to be reserved by two or more of the plurality of network devices for the two or more routes through the network for the first new path (block 470). For example, the controller platform (e.g., using computing resource 224, processor 320, memory 330, storage component 340, communication interface 370, and/or the like) may cause the first planned bandwidth to be reserved by two or more of the plurality of network devices for the two or more routes through the network for the first new path, as described above in connection with FIGS. 1A-3.

Process 400 may include additional implementations, such as any single implementation or any combination of implementations described below and/or in connection with one or more other processes described elsewhere herein.

In some implementations, the controller platform may cause the first planned bandwidth to be reserved by two or more of the plurality of network devices for the single route through the network for the first new path, when the first new path can be provided via a single route through the network.

In some implementations, the controller platform may select, when the first new path can be provided via a single route through the network, information identifying a second new path from the ranked list of the plurality of new paths. The second new path may include a second planned bandwidth of the plurality of planned bandwidths, and the second planned bandwidth may be smaller than the first planned bandwidth. In some implementations, the controller platform may determine whether the second new path can be provided via another single route through the network based on the second planned bandwidth, may identify another two or more routes through the network for the second new path when the second new path cannot be provided via the other single route through the network, and may cause the second planned bandwidth to be reserved by two or more of the plurality of network devices for the other two or more routes through the network for the second new path.

In some implementations, the controller platform may select, when the first new path can be provided via a single route through the network, information identifying each remaining new path from the ranked list of the plurality of new paths, wherein each remaining new path may include a corresponding planned bandwidth of the plurality of planned bandwidths. The controller platform may cause the corresponding planned bandwidths to be reserved by two or more of the plurality of network devices for each remaining new path.

In some implementations, the topology data may include data identifying one or more of the plurality of network devices, the links interconnecting the plurality of network devices, and/or utilizations of the plurality of network devices. In some implementations, the path data may include data identifying one or more of paths through the network provided by the plurality of network devices, sources of the paths through the network, destinations of the paths through the network, and/or utilizations of the paths through the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
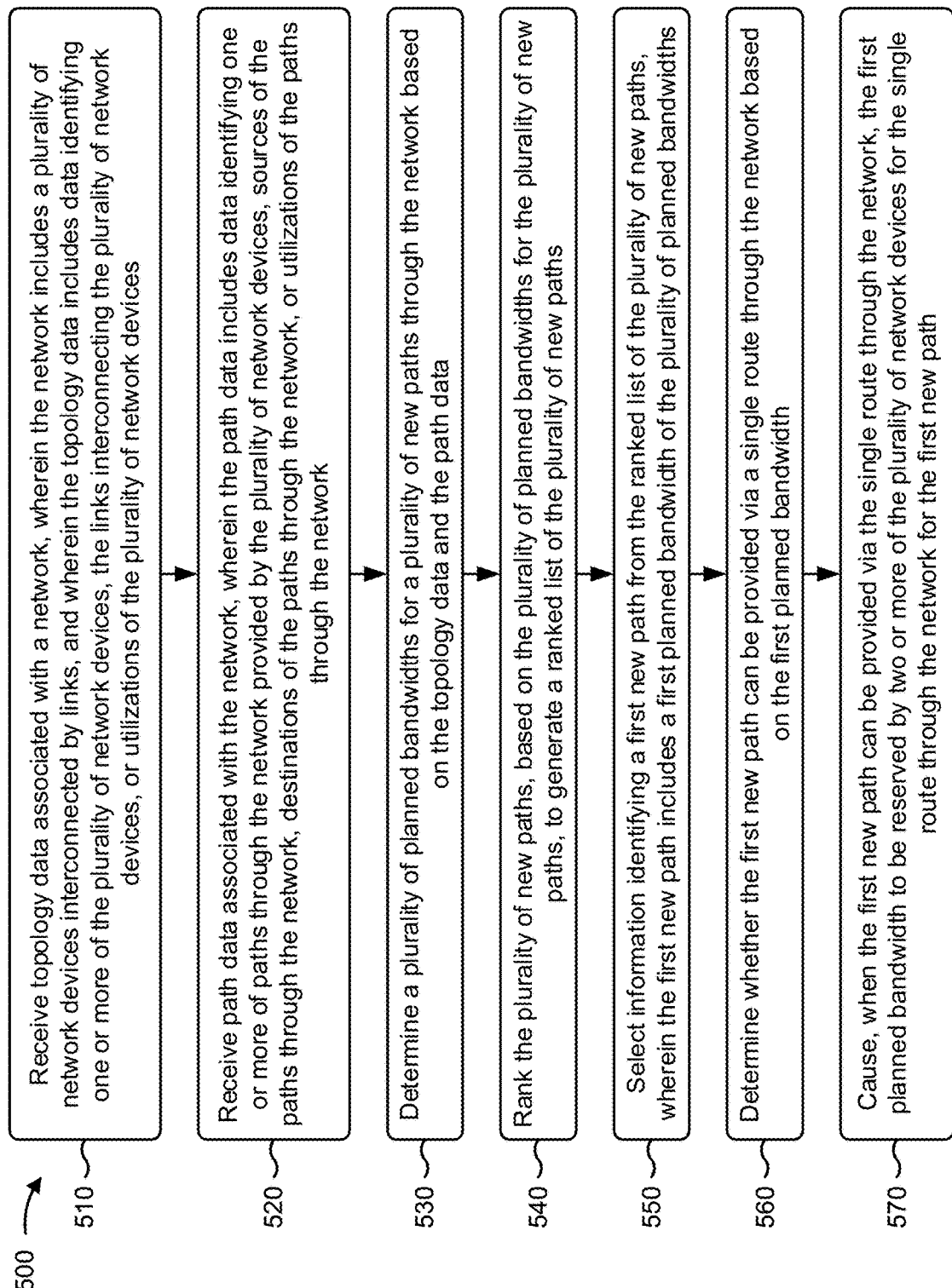

FIG. 5 is a flow chart of an example process 500 for providing centralized dynamic network bandwidth allocation and management. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as an endpoint device (e.g., endpoint device 210) and/or a network device (e.g., network device 240).

As shown in FIG. 5, process 500 may include receiving topology data associated with a network, wherein the network includes a plurality of network devices interconnected by links, and wherein the topology data includes data identifying one or more of the plurality of network devices, the links interconnecting the plurality of network devices, or utilizations of the plurality of network devices (block 510). For example, the controller platform (e.g., using computing resource 224, communication interface 370, and/or the like) may receive topology data associated with a network, as described above in connection with FIGS. 1A-3. In some aspects, the network includes a plurality of network devices interconnected by links, and the topology data includes data identifying one or more of the plurality of network devices, the links interconnecting the plurality of network devices, or utilizations of the plurality of network device.

As further shown in FIG. 5, process 500 may include receiving path data associated with the network, wherein the path data includes data identifying one or more of paths through the network provided by the plurality of network devices, sources of the paths through the network, destinations of the paths through the network, or utilizations of the paths through the network (block 520). For example, the controller platform (e.g., using computing resource 224, processor 320, communication interface 370s and/or the like) may receive path data associated with the network, as described above in connection with FIGS. 1A-3. In some aspects, the path data includes data identifying one or more of paths through the network provided by the plurality of network devices, sources of the paths through the network, destinations of the paths through the network, or utilizations of the paths through the network.

As further shown in FIG. 5, process 500 may include determining a plurality of planned bandwidths for a plurality of new paths through the network based on the topology data and the path data (block 530). For example, the controller platform (e.g., using computing resource 224, processor 320, memory 330, and/or the like) may determine a plurality of planned bandwidths for a plurality of new paths through the network based on the topology data and the path data, as described above in connection with FIGS. 1A-3.

As further shown in FIG. 5, process 500 may include ranking the plurality of new paths, based on the plurality of planned bandwidths for the plurality of new paths, to generate a ranked list of the plurality of new paths (block 540). For example, the controller platform (e.g., using computing resource 224, processor 320, storage component 340, and/or the like) may rank the plurality of new paths, based on the plurality of planned bandwidths for the plurality of new paths, to generate a ranked list of the plurality of new paths, as described above in connection with FIGS. 1A-3.

As further shown in FIG. 5, process 500 may include selecting information identifying a first new path from the ranked list of the plurality of new paths, wherein the first new path includes a first planned bandwidth of the plurality of planned bandwidths (block 550). For example, the controller platform (e.g., using computing resource 224, processor 320, memory 330, and/or the like) may select information identifying a first new path from the ranked list of the plurality of new paths, as described above in connection with FIGS. 1A-3. In some aspects, the first new path includes a first planned bandwidth of the plurality of planned bandwidths.

As further shown in FIG. 5, process 500 may include determining whether the first new path can be provided via a single route through the network based on the first planned bandwidth (block 560). For example, the controller platform (e.g., using computing resource 224, processor 320, storage component 340, and/or the like) may determine whether the first new path can be provided via a single route through the network based on the first planned bandwidth, as described above in connection with FIGS. 1A-3.

As further shown in FIG. 5, process 500 may include causing, when the first new path can be provided via the single route through the network, the first planned bandwidth to be reserved by two or more of the plurality of network devices for the single route through the network for the first new path (block 570). For example, the controller platform (e.g., using computing resource 224, processor 320, memory 330, storage component 340, communication interface 370, and/or the like) may cause, when the first new path can be provided via the single route through the network, the first planned bandwidth to be reserved by two or more of the plurality of network devices for the single route through the network for the first new path, as described above in connection with FIGS. 1A-3.

Process 500 may include additional implementations, such as any single implementation or any combination of implementations described below and/or in connection with one or more other processes described elsewhere herein.

In some implementations, the controller platform, when determining whether the first new path can be provided via the single route through the network, may determine whether the first new path can be provided via the single route through the network based on a constrained shortest path first (CSPF) constraint. In some implementations, controller platform may receive information indicating a time period, may receive the topology data and the path data associated with the network in connection with a beginning of the time period, and may determine the plurality of planned bandwidths for the plurality of new paths through the network in connection with an end of the time period.

In some implementations, the controller platform may receive information indicating a time period, and may aggregate the utilizations of the paths through the network over the time period to determine a total bandwidth. The sum of the plurality of planned bandwidths, for the plurality of new paths through the network, may be substantially equal to the total bandwidth. In some implementations, the controller platform may receive attributes for the plurality of new paths through the network, and determine the plurality of planned bandwidths for the plurality of new paths through the network based on the attributes for the plurality of new paths through the network.

In some implementations, the controller platform may receive a bandwidth threshold associated with the plurality of new paths through the network, and may determine whether the first new path can be provided via the single route through the network based on the bandwidth threshold. In some implementations, the controller platform may identify two or more routes through the network for the first new path when the first new path cannot be provided via the single route through the network, and may cause the first planned bandwidth to be reserved by two or more of the plurality of network devices for the two or more routes through the network for the first new path.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
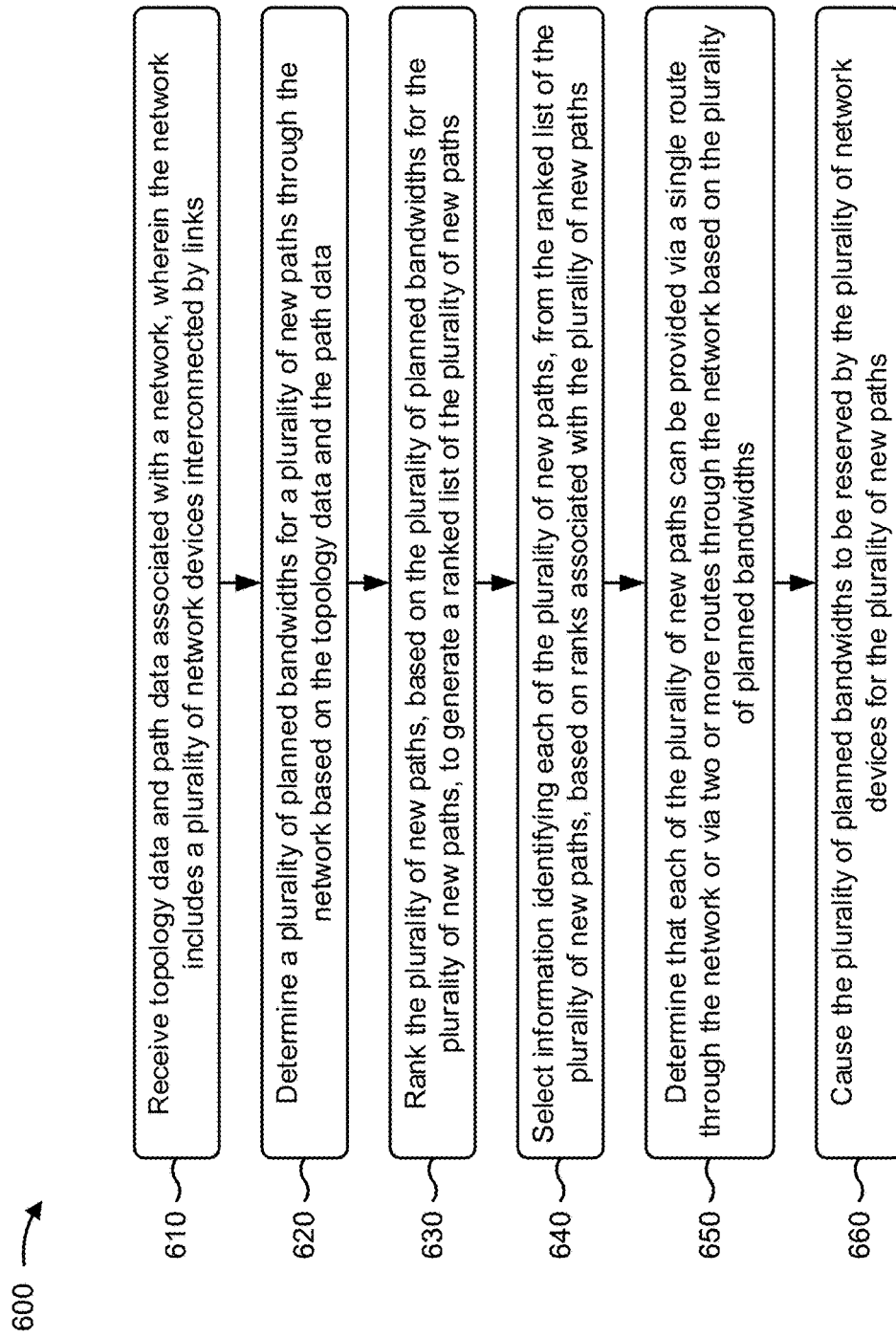

FIG. 6 is a flow chart of an example process 600 for providing centralized dynamic network bandwidth allocation and management. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as an endpoint device (e.g., endpoint device 210) and/or a network device (e.g., network device 240).

As shown in FIG. 6, process 600 may include receiving topology data and path data associated with a network, wherein the network includes a plurality of network devices interconnected by links (block 610). For example, the controller platform (e.g., using computing resource 224, processor 320, communication interface 370, and/or the like) may receive topology data and path data associated with a network, as described above in connection with FIGS. 1A-3. In some aspects, the network includes a plurality of network devices interconnected by links.

As further shown in FIG. 6, process 600 may include determining a plurality of planned bandwidths for a plurality of new paths through the network based on the topology data and the path data (block 620). For example, the controller platform (e.g., using computing resource 224, processor 320, memory 330, and/or the like) may determine a plurality of planned bandwidths for a plurality of new paths through the network based on the topology data and the path data, as described above in connection with FIGS. 1A-3.

As further shown in FIG. 6, process 600 may include ranking the plurality of new paths, based on the plurality of planned bandwidths for the plurality of new paths, to generate a ranked list of the plurality of new paths (block 630). For example, the controller platform (e.g., using computing resource 224, processor 320, storage component 340, and/or the like) may rank the plurality of new paths, based on the plurality of planned bandwidths for the plurality of new paths, to generate a ranked list of the plurality of new paths, as described above in connection with FIGS. 1A-3.

As further shown in FIG. 6, process 600 may include selecting information identifying each of the plurality of new paths, from the ranked list of the plurality of new paths, based on ranks associated with the plurality of new paths (block 640). For example, the controller platform (e.g., using computing resource 224, processor 320, memory 330, and/or the like) may select information identifying each of the plurality of new paths, from the ranked list of the plurality of new paths, based on ranks associated with the plurality of new paths, as described above in connection with FIGS. 1A-3.

As further shown in FIG. 6, process 600 may include determining that each of the plurality of new paths can be provided via a single route through the network or via two or more routes through the network based on the plurality of planned bandwidths (block 650). For example, the controller platform (e.g., using computing resource 224, processor 320, storage component 340, and/or the like) may determine that each of the plurality of new paths can be provided via a single route through the network or via two or more routes through the network based on the plurality of planned bandwidths, as described above in connection with FIGS. 1A-3.

As further shown in FIG. 6, process 600 may include causing the plurality of planned bandwidths to be reserved by the plurality of network devices for the plurality of new paths (block 660). For example, the controller platform (e.g., using computing resource 224, processor 320, memory 330, storage component 340, communication interface 370, and/or the like) may cause the plurality of planned bandwidths to be reserved by the plurality of network devices for the plurality of new paths, as described above in connection with FIGS. 1A-3.

Process 600 may include additional implementations, such as any single implementation or any combination of implementations described below and/or in connection with one or more other processes described elsewhere herein.

In some implementations, the topology data may include data identifying one or more of the plurality of network devices, the links interconnecting the plurality of network devices, or utilizations of the plurality of network devices. In some implementations, the path data may include data identifying one or more of paths through the network provided by the plurality of network devices, sources of the paths through the network, destinations of the paths through the network, or, utilizations of the paths through the network.

In some implementations, the controller platform may determine that each of the plurality of new paths can be provided via the single route through the network or via the two or more routes through the network based on a constrained shortest path first (CSPF) constraint.

In some implementations, the controller platform may receive information indicating a time period, may receive the topology data and the path data associated with the network in connection with a beginning of the time period, and may determine the plurality of planned bandwidths for the plurality of new paths through the network in connection with an end of the time period. In some implementations, the controller platform may receive attributes for the plurality of new paths through the network, and may determine the plurality of planned bandwidths for the plurality of new paths through the network based on the attributes for the plurality of new paths through the network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, topology data and path data associated with a network,
      wherein the network includes a plurality of network devices interconnected by links;
   determining, by the device, a plurality of planned bandwidths for a plurality of new paths through the network based on the topology data and the path data;
   ranking, by the device, the plurality of new paths, based on the plurality of planned bandwidths for the plurality of new paths, to generate a ranked list of the plurality of new paths;
   selecting, by the device, information identifying a first new path from the ranked list of the plurality of new paths,
      wherein the first new path includes a first planned bandwidth of the plurality of planned bandwidths;
   determining, by the device, whether the first new path can be provided via a single route through the network based on the first planned bandwidth;
   identifying, by the device, two or more routes through the network for the first new path when the first new path cannot be provided via the single route through the network; and
   causing, by the device, the first planned bandwidth to be reserved by two or more of the plurality of network devices for the two or more routes through the network for the first new path.

2. The method of claim 1, further comprising:
   causing the first planned bandwidth to be reserved by two or more of the plurality of network devices for the single route through the network for the first new path, when the first new path can be provided via a single route through the network.

3. The method of claim 1, further comprising:
   selecting, when the first new path can be provided via a single route through the network, information identifying a second new path from the ranked list of the plurality of new paths,
      wherein the second new path includes a second planned bandwidth of the plurality of planned bandwidths, and
      wherein the second planned bandwidth is smaller than the first planned bandwidth.

4. The method of claim 3, further comprising:
   determining whether the second new path can be provided via another single route through the network based on the second planned bandwidth;
   identifying another two or more routes through the network for the second new path when the second new path cannot be provided via the other single route through the network; and
   causing the second planned bandwidth to be reserved by two or more of the plurality of network devices for the other two or more routes through the network for the second new path.

5. The method of claim 1, further comprising:
   selecting, when the first new path can be provided via a single route through the network, information identifying each remaining new path from the ranked list of the plurality of new paths,
      wherein each remaining new path includes a corresponding planned bandwidth of the plurality of planned bandwidths; and
   causing corresponding planned bandwidths to be reserved by two or more of the plurality of network devices for each remaining new path.

6. The method of claim 1, wherein the topology data includes data identifying one or more of:
   the plurality of network devices,
   the links interconnecting the plurality of network devices, or
   utilizations of the plurality of network devices.

7. The method of claim 1, wherein the path data includes data identifying one or more of:
   paths through the network provided by the plurality of network devices,
   sources of the paths through the network,
   destinations of the paths through the network, or
   utilizations of the paths through the network.

8. A device, comprising:
   one or more memories; and
   one or more processors, communicatively coupled to the one or more memories, to:
      receive topology data associated with a network,
         wherein the network includes a plurality of network devices interconnected by links, and
         wherein the topology data includes data identifying one or more of:
            the plurality of network devices,
            the links interconnecting the plurality of network devices, or
            utilizations of the plurality of network devices;
      receive path data associated with the network,
         wherein the path data includes data identifying one or more of:
            paths through the network provided by the plurality of network devices,
            sources of the paths through the network,
            destinations of the paths through the network, or
            utilizations of the paths through the network;
      determine a plurality of planned bandwidths for a plurality of new paths through the network based on the topology data and the path data;
      rank the plurality of new paths, based on the plurality of planned bandwidths for the plurality of new paths, to generate a ranked list of the plurality of new paths;
      select information identifying a first new path from the ranked list of the plurality of new paths,
         wherein the first new path includes a first planned bandwidth of the plurality of planned bandwidths;
      determine whether the first new path can be provided via a single route through the network based on the first planned bandwidth; and cause, when the first new path can be provided via the single route through the network, the first planned bandwidth to be reserved by two or more of the plurality of network devices for the single route through the network for the first new path.

9. The device of claim 8, wherein the one or more processors, when determining whether the first new path can be provided via the single route through the network, are to:
determine whether the first new path can be provided via the single route through the network based on a constrained shortest path first (CSPF) constraint.

10. The device of claim 8, wherein the one or more processors are further to:
receive information indicating a time period,
wherein the one or more processors, when receiving the topology data and the path data associated with the network, are to:
receive the topology data and the path data associated with the network in connection with a beginning of the time period, and
wherein the one or more processors, when determining the plurality of planned bandwidths for the plurality of new paths through the network, are to:
determine the plurality of planned bandwidths for the plurality of new paths through the network in connection with an end of the time period.

11. The device of claim 8, wherein the one or more processors are further to:
receive information indicating a time period; and
aggregate the utilizations of the paths through the network over the time period to determine a total bandwidth,
wherein the total bandwidth is based on a sum of the plurality of planned bandwidths for the plurality of new paths through the network.

12. The device of claim 8, wherein the one or more processors are further to:
receive attributes for the plurality of new paths through the network,
wherein the one or more processors, when determining the plurality of planned bandwidths for the plurality of new paths through the network, are to:
determine the plurality of planned bandwidths for the plurality of new paths through the network based on the attributes for the plurality of new paths through the network.

13. The device of claim 8, wherein the one or more processors are further to:
receive a bandwidth threshold associated with the plurality of new paths through the network,
wherein the one or more processors, when determining whether the first new path can be provided via the single route through the network, are to:
determine whether the first new path can be provided via the single route through the network based on the bandwidth threshold.

14. The device of claim 8, wherein the one or more processors are further to:
identify two or more routes through the network for the first new path when the first new path cannot be provided via the single route through the network; and
cause the first planned bandwidth to be reserved by two or more of the plurality of network devices for the two or more routes through the network for the first new path.

15. A non-transitory computer-readable medium storing instructions, the instructions comprising:
one or more instructions that, when executed by one or more processors, cause the one or more processors to:
receive topology data and path data associated with a network,
wherein the network includes a plurality of network devices interconnected by links;
determine a plurality of planned bandwidths for a plurality of new paths through the network based on the topology data and the path data;
rank the plurality of new paths, based on the plurality of planned bandwidths for the plurality of new paths, to generate a ranked list of the plurality of new paths;
select information identifying each of the plurality of new paths, from the ranked list of the plurality of new paths, based on ranks associated with the plurality of new paths;
determine that each of the plurality of new paths can be provided via a single route through the network or via two or more routes through the network based on the plurality of planned bandwidths; and
cause the plurality of planned bandwidths to be reserved by the plurality of network devices for the plurality of new paths.

16. The non-transitory computer-readable medium of claim 15, wherein the topology data includes data identifying one or more of:
the plurality of network devices,
the links interconnecting the plurality of network devices, or
utilizations of the plurality of network devices.

17. The non-transitory computer-readable medium of claim 15, wherein the path data includes data identifying one or more of:
paths through the network provided by the plurality of network devices,
sources of the paths through the network,
destinations of the paths through the network, or
utilizations of the paths through the network.

18. The non-transitory computer-readable medium of claim 15, wherein the one or more instructions, that cause the one or more processors to determine that each of the plurality of new paths can be provided via a single route through the network or via two or more routes through the network, cause the one or more processors to:
determine that each of the plurality of new paths can be provided via the single route through the network or via the two or more routes through the network based on a constrained shortest path first (CSPF) constraint.

19. The non-transitory computer-readable medium of claim 15, wherein the instructions further comprise:
one or more instructions that, when executed by the one or more processors, cause the one or more processors to:
receive information indicating a time period,
wherein the one or more instructions, that cause the one or more processors to receive the topology data and the path data associated with the network, cause the one or more processors to:
receive the topology data and the path data associated with the network in connection with a beginning of the time period, and
wherein the one or more instructions, that cause the one or more processors to determine the plurality of planned bandwidths for the plurality of new paths through the network, cause the one or more processors to:
determine the plurality of planned bandwidths for the plurality of new paths through the network in connection with an end of the time period.

20. The non-transitory computer-readable medium of claim 15, wherein the instructions further comprise:
one or more instructions that, when executed by the one or more processors, further cause the one or more processors to:
receive attributes for the plurality of new paths through the network,
wherein the one or more instructions, that cause the one or more processors to determine the plurality of planned bandwidths for the plurality of new paths through the network, cause the one or more processors to:
determine the plurality of planned bandwidths for the plurality of new paths through the network based on the attributes for the plurality of new paths through the network.

\* \* \* \* \*